United States Patent
Goncalves

(10) Patent No.: US 9,697,739 B1
(45) Date of Patent: Jul. 4, 2017

(54) MUSIC TRAINING SYSTEM AND METHOD

(71) Applicant: Percebe Music Inc., Pensacola, FL (US)

(72) Inventor: Pitagoras Goncalves, Pensacola, FL (US)

(*) Notice: Subject to any disclaimer, the term of this patent is extended or adjusted under 35 U.S.C. 154(b) by 0 days.

(21) Appl. No.: 15/385,677

(22) Filed: Dec. 20, 2016

Related U.S. Application Data

(60) Provisional application No. 62/274,754, filed on Jan. 4, 2016.

(51) Int. Cl.
*G09B 15/08* (2006.01)
*G09B 15/02* (2006.01)
*G10H 1/00* (2006.01)

(52) U.S. Cl.
CPC ......... *G09B 15/023* (2013.01); *G10H 1/0008* (2013.01); *G10H 2210/091* (2013.01); *G10H 2220/015* (2013.01); *G10H 2220/091* (2013.01)

(58) Field of Classification Search
CPC .............. G09B 15/023; G10H 1/008; G10H 2210/091; G10H 2220/015; G10H 2220/091
USPC .......................................................... 84/478
See application file for complete search history.

(56) References Cited

U.S. PATENT DOCUMENTS

| | | |
|---|---|---|
| 6,204,441 B1 | 3/2001 | Asahi |
| 6,281,422 B1 | 8/2001 | Kawamura |
| 7,956,275 B2 * | 6/2011 | Ikeya ............... G09B 15/002 84/477 R |
| 8,338,684 B2 * | 12/2012 | Pillhofer ............ G09B 15/00 84/470 R |
| 8,536,436 B2 | 9/2013 | Moreno |
| 8,629,342 B2 | 1/2014 | Lee |
| 8,735,707 B2 | 5/2014 | Paterson |
| 8,847,053 B2 | 9/2014 | Humphrey |
| 8,865,990 B2 * | 10/2014 | Minamitaka ....... G10H 1/0008 84/609 |
| 9,018,503 B2 * | 4/2015 | Tanaka .............. G09B 15/00 84/465 |
| 2001/0039870 A1 * | 11/2001 | Shimaya ........... G09B 15/023 84/478 |
| 2004/0123726 A1 * | 7/2004 | Kato ................. G10H 1/0008 84/609 |
| 2005/0235809 A1 * | 10/2005 | Kageyama ......... G10H 1/0008 84/601 |

(Continued)

*Primary Examiner* — Jeffrey Donels
(74) *Attorney, Agent, or Firm* — Steinberg Intellectual Property Law LLC; Gloria M. Steinberg, Esq.

(57) ABSTRACT

A system and a method for music training are described. The system includes an application having an evaluation module, an event correlation module, and a feedback module. The application, upon receiving a live performance input via a user device from a musical instrument, generates digital performance data to analyzes various aspects of the performance in real-time. In one embodiment, the event correlation module compares the performance to a composite performance standard, while the evaluation module analyzes rhythm, tempo, duration, dynamics, pedaling, volume, articulation, and note, and the feedback module displays performance evaluation and music score in real-time. In this way, the system analyzes musical performance in a way that is akin to a highly developed musical human perception.

18 Claims, 8 Drawing Sheets

(56) References Cited

U.S. PATENT DOCUMENTS

| | | | | |
|---|---|---|---|---|
| 2007/0022866 | A1* | 2/2007 | Perla | G09B 15/00 |
| | | | | 84/609 |
| 2009/0031884 | A1* | 2/2009 | Arai | G09B 15/002 |
| | | | | 84/609 |
| 2010/0304863 | A1* | 12/2010 | Applewhite | G10H 1/368 |
| | | | | 463/36 |
| 2011/0003638 | A1* | 1/2011 | Lee | G09B 15/00 |
| | | | | 463/35 |
| 2011/0283866 | A1* | 11/2011 | Hogan | G09B 15/003 |
| | | | | 84/470 R |
| 2013/0081531 | A1* | 4/2013 | Minamitaka | G10H 1/00 |
| | | | | 84/477 R |
| 2013/0164727 | A1 | 6/2013 | Dzakula | |
| 2015/0317911 | A1* | 11/2015 | Kawabata | G10G 1/00 |
| | | | | 84/470 R |

* cited by examiner

| Student Performance 117 | Performance Standard #1 301A | Performance Standard #2 301B | Performance Standard #n 301C |
|---|---|---|---|
| Rhythm 501 | X | | |
| Tempo 502 | | X | |
| Duration 503 | X | X | |
| Dynamics 504 | | | X |
| Pedaling 505 | | | X |
| Volume 506 | | X | |
| Articulation 507 | X | | |
| Note 508 | | X | |

FIG. 5A

| Student Performance 117 | Performance Standard #1 301A | Performance Standard #2 301B | Composite Performance Standard 304 |
|---|---|---|---|
| Rhythm 501 | X |  | X |
| Tempo 502 |  | X | X |
| Duration 503 | X | X | X |
| Dynamics 504 |  |  | X |
| Pedaling 505 | X |  | X |
| Volume 506 |  | X | X |
| Articulation 507 | X |  | X |
| Note 508 |  |  |  |

FIG. 5B

MUSIC TRAINING SYSTEM AND METHOD

CROSS-REFERENCE TO RELATED APPLICATIONS

This application claims the benefit of U.S. Provisional Patent Application No. 62/274,754, filed Jan. 4, 2016, which is hereby incorporated by reference in its entirety.

FIELD OF THE INVENTION

The present invention generally relates to a system and method for providing music instructions. More particularly, the present invention is directed to a computerized system and method for enhancing music skills and artful performance.

BACKGROUND OF THE INVENTION

Traditional music education typically requires students to practice playing musical instruments privately, though some practice in formal classroom settings. Students are evaluated by their teachers on a one-on-one basis so that the teachers can observe students and critique their performance. In most cases, students spend a majority of time practicing on their own and do not have opportunities to receive timely feedback, however. For this reason, it is easy for students to form bad habits that are difficult to break.

Additionally, it can be difficult for teachers to detect every mistake and shortfalls of students' performances by evaluating them in person. For example, teachers may be unable to observe all of the problems in a limited amount of time. In this way, traditional music education does not enable all teachers to provide thoughtful and detailed critique.

Some systems in the prior art claim means for providing music instructions with feedback. These include systems that have been patented and published in patent application publications. The foregoing is a list of prior art deemed most relevant to the present disclosure, which is herein described for the purposes of highlighting and differentiating the unique aspects of the present invention, and further highlighting the drawbacks existing in the prior art.

Specifically, Hogan, U.S. Patent Application Publication No. 2011/0283866, discloses an education system for playing a musical instrument. Hogan discloses comparing test data generated by a student to a reference data for note, timing, and duration accuracy using the scoring system. However, Hogan is limited in that it does not disclose analyzing rhythm, tempo, duration, dynamics, pedaling, volume, articulation, and note. Additionally, the reference data includes a single set of correct or acceptable answers. Thus, Hogan does not disclose a reference data having a plurality of performance standards that is aggregated for the purposes of scoring a student's performance. Additionally, the reference data of Hogan cannot be used for determining the student's style of playing music.

Similarly, Moreno, U.S. Pat. No. 8,536,436, discloses a system that scores a student when playing a musical instrument. The system of Moreno includes a tracking progress module that collects user performance information and compares it to skills of other people. Preferably, the user is compared to other people sharing a similar characteristic with the user, such as age. In this regard, the system of Moreno does not necessarily disclose reference data that is generated by experienced musicians and/or artists. In this way, the system of Moreno is directed to a peer review system rather than an object-oriented system.

Humphrey U.S. Pat. No. 8,847,053, discloses a system that comprises a dynamic point reference grid, which includes a tempo map for a musical composition. The dynamic point reference grid does not disclose MIDI and aggregate performance standards generated from expert or model performances that can be pre-recorded. The dynamic point reference grid can be used to analyze at least a portion of a student's performance. In this regard, the system of Humphrey does not analyze the student's performance based on aggregate performance standards.

Other systems are directed to providing visual feedback to a student while playing music. For instance, Dzakula, U.S. Patent Application Publication No. 2013/0164727, and Asahi, U.S. Pat. No. 6,204,441, provide feedback in nearly real-time. In certain embodiments, Dzkula allows instructors and/or teachers to access the records of the student's performances at a later time for evaluation. Dzakula and Asahi, however, do not disclose any reference data. In contrast, Paterson, U.S. Pat. No. 8,735,707, allows a student to record his or her own sessions and share it with his or her contacts at a later time. Thus, Paterson allows the student to receive feedback after the performance instead of during, thereby eliminating means for receiving real-time analyses using any reference data.

Lee, U.S. Pat. No. 8,629,342, discloses a system that allows a student to compare his or her performance to that of an expert's. While Lee discloses reference data that comprises data generated from an expert's performance, Lee does not comprise a plurality of data generated from a number of experts such that the data can be aggregated. In this regard, Lee is disadvantageous in that it would encourage students to imitate a single artist's performance, thereby discouraging students to explore and practice different styles and techniques.

The systems disclosed in the prior art have several known drawbacks, however. These systems are limited in that they do not provide analysis using aggregate reference data, and that they do not provide a comprehensive musical performance evaluation and assessment. In this regard, the invention described herein addresses this problem.

SUMMARY OF THE INVENTION

In view of the disadvantages inherent in the known types of systems for providing music instructions now present in the prior art, the present invention provides an improved system and method for real-time music training.

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

In certain embodiments, the present system comprises a memory unit having instructions stored thereon, and a processor operatively connected to the memory unit for executing the instructions, resulting in an application. Additionally, the processor is in wired or wireless communication with one or more musical instruments. Preferably, the present invention may be used with various types of musical instruments. For the purposes of clarity, however, the present invention will be described as used with a piano or other similar instruments such as keyboards.

In some embodiments, the application establishes communication with a database (i.e., remote or local), which comprises the reference data, wherein the reference data comprises, without limitation, MIDI and aggregate performance standards associated with performances by various experts and/or artists, as well as other types of data (e.g., music scores) pertinent for assessing musical performance. The performance standards may be derived from existing audio and MIDI data and/or from a performance, depending upon the embodiment. The performance standards can be updated and/or diversified, for example, by increasing the pool of performance standards as more performances are added to the database. It is contemplated, therefore, that machine-learning algorithm may be used to derive acceptable performance standards from existing and/or new performances. In this way, the performance standards need not be derived from pre-recorded performances over time.

The aggregate performance standard for each musical piece is consolidated with a music score to determine a composite performance standard. The music score represents each musical event (e.g., notes played, pedaling, etc.) in a data set that can be correlated with each musical event of each performance, thereby allowing each event to be analyzed and displayed together.

In some embodiments, the application is configured to digitize sounds of a student's musical performance (i.e., a live musical performance) on the musical instrument. The digital performance data is used to evaluate various aspects of the student's performance via an evaluation module of the application. Without limitation, the performance data includes various musical events in a musical piece played, including each note played, the volume of each note, and the duration of each note played. In other embodiments, other data may comprise data pertaining to use of a pedal, if applicable.

The digital performance data that is generated from the student's performance is compared to the reference data in the database in real-time via an event correlation module of the application. More specifically, the digital performance data from the student's performance is compared to the composite performance standard that is associated with the same musical piece. If the student's performance data falls within an acceptable range as defined by the composite performance standard, the application determines that the student's performance is up to standard. If the student's performance data falls outside of the acceptable range, then the application determines that the student's performance is below standard. For example, if the student performance data comprises extra notes or missing/delayed/early notes, the student's performance is below standard. Additionally, the application is configured to determine how close the student's performance is to the composite performance standard.

Performance evaluation is delivered to the student performer in real-time via a feedback module, which is configured to show a graphical depiction of a music score and/or a visualization of the performance evaluation. The feedback module is further configured to display alerts (e.g., messages or graphic indicators) to the student. In this way, the student can make an immediate correction without the need for a teacher's supervision and resume practicing.

It is therefore an objective of the present invention to provide a music training system that evaluates musical performances against composite performance standards, wherein the composite performance standards comprise aggregate performance standards combined with a music score for each musical event in a musical piece.

It is another objective of the present invention to provide a system for providing music instructions by analyzing rhythm, tempo, duration, dynamics, pedaling, volume, articulation, and note via an evaluation module.

It is yet another objective of the present invention to provide a system for providing music instructions by correlating notes and events of a live musical performance with the same notes and events in the reference data via an event correlation module.

It is still another objective of the present invention to provide a system and method for providing music instructions for keyboard musical instruments.

It is still another objective of the present invention to provide a system for providing real-time feedback via a feedback module.

In the light of the foregoing, these and other objectives are accomplished in accordance with the principles of the present invention, wherein the novelty of the present invention will become apparent from the following detailed description and appended claims.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which:

FIGS. 5A and 5B show embodiments of the event correlation module and the evaluation module in operation.

DETAILED DESCRIPTION OF THE INVENTION

Figure 1:
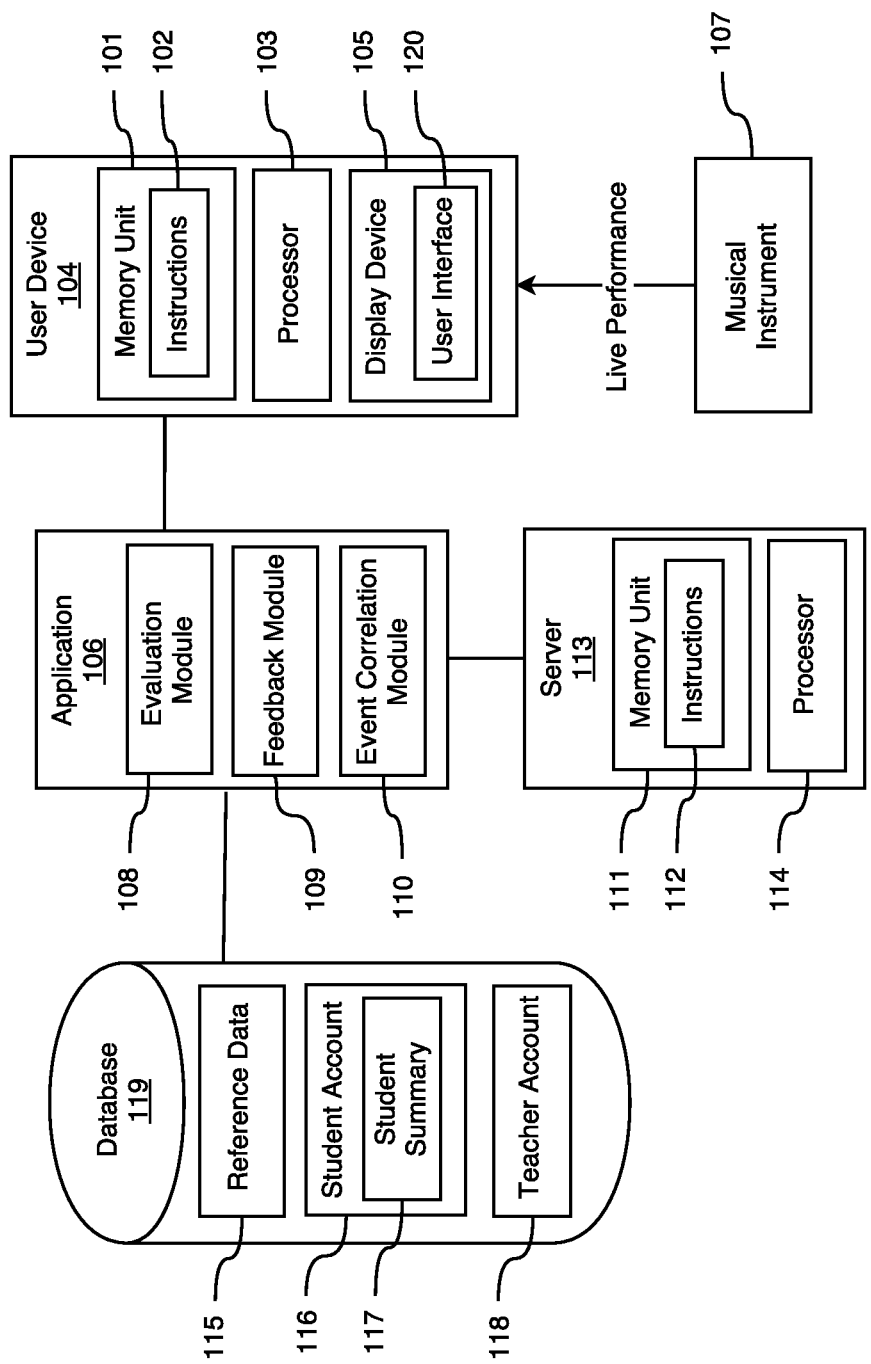
FIG. 1 is a high-level block diagram of an embodiment of the present system.

The present invention is directed towards a system and method for providing evaluation and assessment of musical performances. For purposes of clarity, and not by way of limitation, illustrative views of the present system and method are described with references made to the above-identified figures. Various modifications obvious to one skilled in the art are deemed to be within the spirit and scope of the present invention.

As used in this application, the terms "component," "module," "system," "interface," or the like are generally intended to refer to a computer-related entity, either hardware or a combination of hardware and software. For example, a component can be but is not limited to being, a process running on a processor, an object, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

It is to be appreciated that determinations or inferences referenced throughout the subject specification can be practiced through the use of artificial intelligence techniques. In this regard, some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Discussions herein utilizing terms such as, for example, "processing," "computing," "calculating," "determining," "establishing," "identifying," "analyzing," "checking," or the like, may refer to operations(s) and/or process(es) of a computer, a computing platform, a computing system, or other electronic computing device, that manipulate and/or transfer data represented as physical (e.g., electronic) quantities within the computer's registers and/or memories into other data similarly represented as physical quantities within the computer's registers and/or memories or other information storage medium that may store instructions to perform operations and/or processes.

Some embodiments of the present invention may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a personal computer (PC), a desktop computer, a mobile computer, a laptop, a tablet computer, a server computer, a handheld device, a personal digital assistant (PDA), a wireless communication device, a smart phone, a non-portable device, a wireless access point (AP), a wired or wireless router, a wired or wireless modem, a wired or wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), or networks operating in accordance with existing and/or future versions and/or derivatives of long-term evolution (LTE), a device which incorporates a global positioning system (GPS) receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, or the like.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or." Additionally, the articles "a" and "an" as used in this application and the appended claims should generally be construed to mean "at least one" or "one or more" unless specified otherwise or clear from context to be directed to a singular form.

Figure 2:
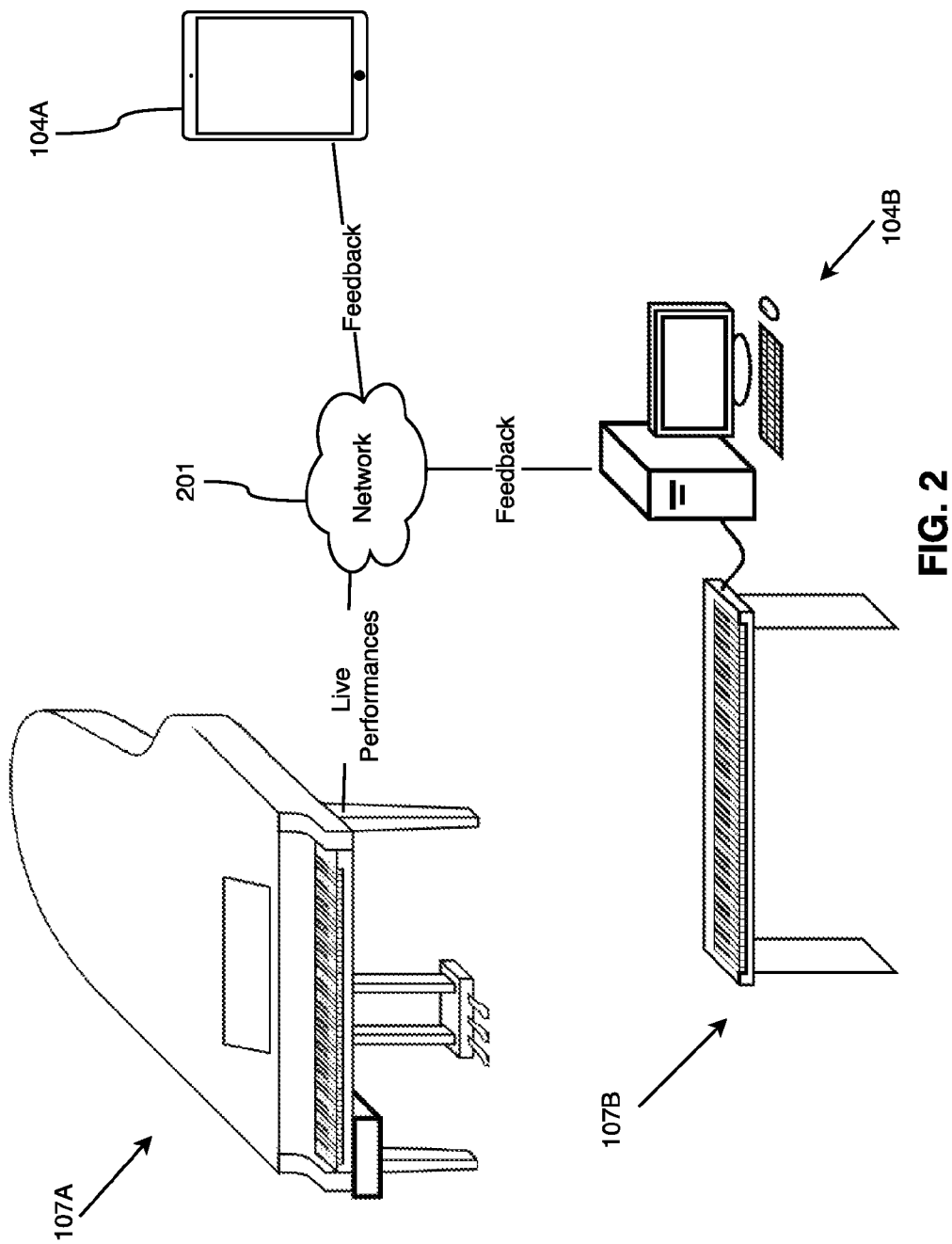
FIG. 2 is a simplified diagram of an embodiment of the present system.

Referring now to FIGS. 1 and 2, there is shown a block diagram and a simplified diagram of an exemplary embodiment of the present system. The system comprises at least one network-enabled user device 104 having a memory unit 101 with instructions 102 stored thereon, and a processor 103 operatively connected to the memory unit 101, wherein the processor 103 is configured to execute the instructions 102 to result in an application 106, wherein the application 106 can comprise a mobile application, a computer application, a web application, a website, a plug-in, and the like. The user device 104 comprises various types of computers such as a tablet computer 104A or a desktop 104B in a network 201.

In some embodiments, the application 106 is supported via a server 113, wherein the server 113 also comprises a computer with a memory unit 111 having instructions 112 stored thereon, and a processor 114 connected to the memory for executing the instructions 112 (i.e., for supporting the application 106). In the illustrated embodiment, the application 106 comprises an evaluation module 108, a feedback module 109, and an event correlation module 110. The application 106 is configured to facilitate communication between the user device 104 and one or more musical instruments 107, for instance, via a user interface 120 that is visible on a display device 105 (i.e., display screen, monitor) of the user device 104.

The user interface 120 enables a user to interact with one or more components of the present system (e.g., user device 104). In some embodiments, the user interface 120 is configured for receiving commands via user input and for displaying information. For example, the user interface 120 comprises a graphic user interface (GUI) having a log in/log out screen, a home page screen, a student summary screen, a feedback screen, a score history screen, user preferences screen, etc.

The user device 104 is connected to the musical instrument 107 in a wired or wireless manner. In certain embodiments, the musical instrument 107 comprises a piano 107A and/or another type of keyboard instrument with MIDI output 107B. The musical instrument 107 may be configured to transmit data to a computer system connected thereto. More particularly, the musical instrument 107 is configured to transmit analog sound waves generated from a student's live musical performance to the user device 104 connected thereto, wherein the user device 104 is configured to digitize the analog sound waves (e.g., via an A/D converter) in order to generate digitized performance data associated with the student performer. In this way, the digitized performance data comprises live musical performance performed by the student.

In some embodiments, the application 106 is configured to prompt the student to play a musical piece that is associated with a reference data 115 stored in a database 119, wherein the reference data 115 comprises performance standards for the same musical piece performed by the student. In some embodiments, the application 106 may be configured to recognize a musical piece performed so that as the student starts performing, the evaluation module 108 can automatically refer to the corresponding reference data 115 in the database 119. Alternatively, the application 106 is configured to refer to the corresponding reference data 115 from the database 119 upon receiving user input (i.e., title of a musical piece) from the student, via for example, the user interface 120. In this regard, the student can enter or select the title of a musical piece and then play that musical piece.

During the performance, the event correlation module 110 is configured to correlate the notes that the student is playing with the same notes played in the reference data 115. The event correlation module 110 is also configured to correlate other events, such as pedaling and flipping a lever on the instrument 107. Correlating musical events in the student's performance with the musical events in various performance standards in the reference data 115 allows the application 106 to recognize the student's performance style. More specifically, the event correlation module 110 is configured to determine whether the student's performance style is similar to one or more combinations of the performance standards used for reference data 115 in order to analyze the student's performance more effectively.

The evaluation module 108 of the application 106 is configured to evaluate the student's live musical performance by analyzing the digitized performance data. The evaluation module 108 analyzes various aspects of the student's performance in real-time. Without limitation, the evaluation module 108 can analyze rhythm, tempo, duration, dynamics, pedaling, volume, articulation, and note during a live musical performance. For example, the evaluation module 108 is configured to analyze each note that is played; the time at which a note is depressed; the speed that each key is depressed; the duration of which each key is depressed; and the time and manner in which pedals are used. In this way, evaluation module 108 analyzes musical performance in a way that is very close to a highly developed musical human perception. In some embodiments, the evaluation module 108 is configured to analyze the student's performance based on the student's performance style as determined by the event correlation module 110.

As the evaluation module 108 completes evaluation in real-time and generates performance evaluation and music score, the feedback module 109 displays the student's music score and/or a visualization of the performance evaluation. The score may be displayed either in a traditional page layout or as a single horizontal sequence of music notation, depending upon embodiment. The score may also be displayed as either traditional music notation or some alternative musical notation. The evaluation visualization may be displayed either as markings on the score, or adjacent to the score, as either a two-dimensional or three-dimensional visualization or graphic display. Additionally, the evaluation visualization may be displayed in form of text or messages. The student can set user preferences via the user interface 120 to modify how the score/performance evaluation is displayed. In this way, students can make immediate corrections without a teacher's supervision while performing.

Optionally, each of the sessions (i.e., a student's performance) may be logged or recorded so that the students and/or teachers can access and review previously played performances at a later time. Moreover, logged or recorded performances can be used for further analysis, such as the student's performance style and musicality. Digitized performance data, music score, and performance evaluation associated with the student performer can be stored in a database 119, which is in communication with the user device 104, via the network (e.g., the Internet, intranet, etc.).

In addition, the database 119 comprises reference data 115, student account information 116, and teacher account information 118. The student account information 116 comprises account information associated with a student (e.g., username, password, assigned instructor(s), billing information, etc.) and student summary 117. Without limitation, the student summary 117 comprises information relating to the student's performances, previous evaluations, and the student's progress. Similarly, the teacher account information 118 comprises account information associated with a teacher (e.g., username, password, assigned students, credentials, etc.).

Figure 3:
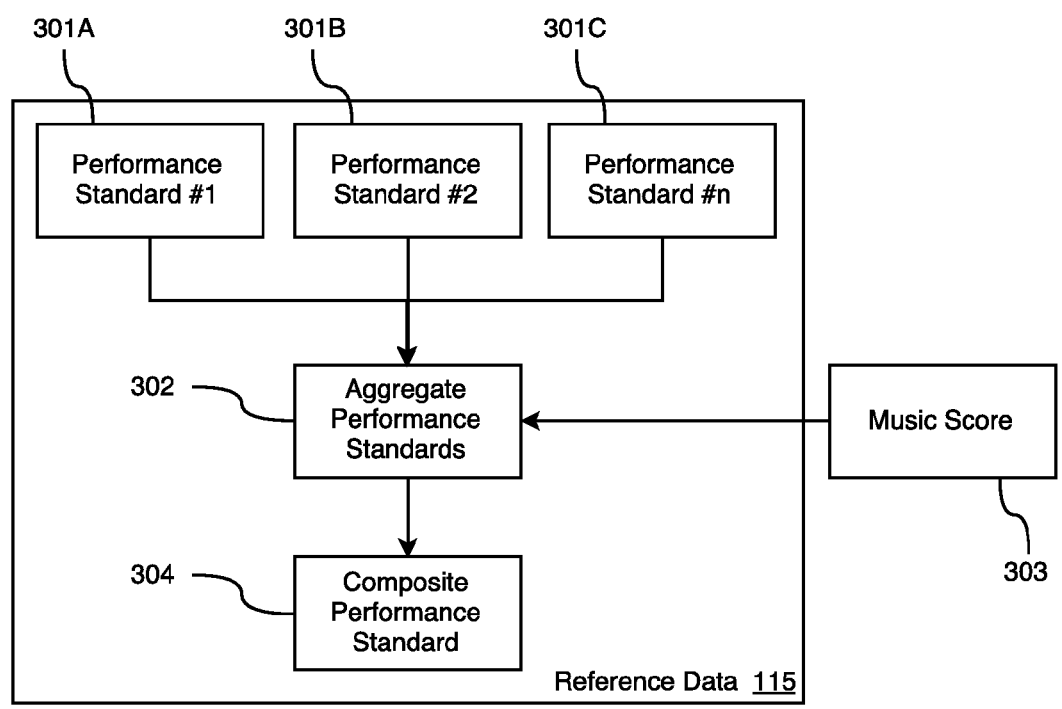
FIG. 3 is a block diagram of the reference data of the present system.
Figure 4:
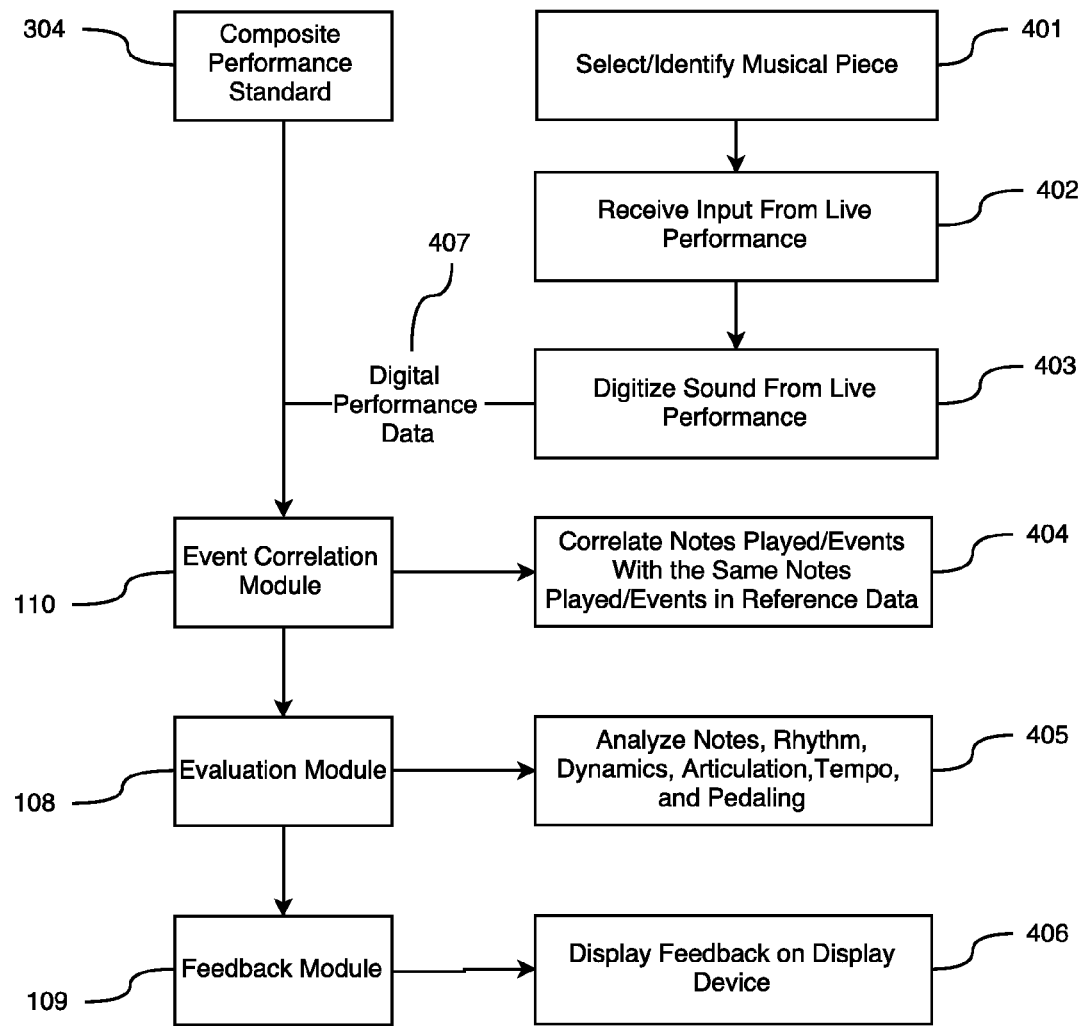
FIG. 4 shows a block diagram of the evaluation feature of the present system.

As shown in FIGS. 3 and 4, the reference data 115 includes performance standards 301A-301C generated by one or more artists. In this regard, a first performer generates a first performance standard 301A; a second performer generates a second performance standard 301B; a third performer generates a third performance standard 301C, and so on. All of the performance standards are aggregated or averaged to determine aggregate performance standards 302, which is consolidated with music score 303 to determine a composite performance standard 304.

The performance standards 301A-301C are aggregated or averaged into a single data set, which defines the acceptable ranges for data points or defines several different acceptable artistic interpretations of the music. Each musical event (e.g., notes played, pedaling, etc.) in a data set representing a music score 303 is correlated with each musical event of each performance, thereby allowing each event to be analyzed and displayed together.

In some embodiments, a performance standard 301A-301C may be derived from a new performance (i.e., performed live) or derived from an existing audio and MIDI data in the database. If an existing audio (i.e., stored in the database 119 (FIG. 1)) is used, then all of the data associated therewith, including music scores, from the database is incorporated for use. If the performance standard is derived from a new performance, then the data associated with the performance standard does not need to be derived from the database. This is advantageous in that not all musical pieces need to be performed beforehand in order to derive reference data 115.

It is contemplated that the new performance may be performed live, streamed, recorded, or uploaded (e.g., via a USB or remote memory unit) by a user (i.e., a teacher or a student). In this regard, reference data 115 in the database 119 (FIG. 1) is continuously updated to add new performance standards and/or update existing performance standards. In some embodiments, the present system may be in communication with third party systems to receive new and/or updated performance standards from third party sources. Each time performance standards are updated or added, the aggregate performance standards 302, and thereby the composite performance standards 304, are also updated.

Each of the performance standards 301A-301C defines acceptable values for various factors in all of the notes played in a piece. In this way, the composite performance standard 304 can define acceptable threshold ranges for various musical factors in all of the notes played in a piece. For example, a first performance can play a note at loudness value of 60, and a second performance can play a note at loudness value of 70. The loudness values of the performance standards are compared to that of a student's in order to determine the acceptable loudness range for that particular student. If the student's loudness value is closer to 60, then the acceptable range may be 58 to 62. If the student's loudness value is closer to 70, then the acceptable range may be 68 to 72. Alternatively, the performance standards can be averaged so that the acceptable range represents all of the performance standards, depending upon embodiment. Thus, if the first performance can play a note at loudness value of 60 and the second performance can play a note at loudness value of 70, the average loudness value is 65 and the acceptable range is 63 to 67. The system may optionally include a margin of error (e.g., 10%), wherein the margin of error may be set by default or adjusted by a teacher. Accordingly, the acceptable range for the loudness value can differ from a student to a student, depending on each student's performance style.

In operation, the user can enter or select a musical piece to play via the application 401. Once the musical piece is selected or identified, the application is configured to load and/or to retrieve reference data associated with the musical piece, wherein the reference data comprises the composite performance standard associated with the musical piece. Upon entering the musical piece, the application receives input from a live student performance 402. The live performance is digitized 403 or converted into a digital performance data 407, wherein the digital performance data comprises musical events associated with the musical piece. The event correlation module 110 then correlates the musical events in the digital performance data with corresponding musical events in the reference data and compares the digital performance data with the composite performance standard 404. In this regard, the event correlation module 110 can determine the student's performance style based upon the amount of correlation between the musical events in the student's performance data and the musical events in the performance standards The evaluation module 108 determines whether the digital performance data falls within an acceptable range for one or more musical factors (i.e., by analyzing notes, rhythm, dynamics, articulation, tempo, pedaling, etc.) as defined by the composite performance standard 405. If the evaluation module 108 determines that the student's data from the live performance fall within the predetermined threshold or acceptable range as defined by the composite performance standard 304, the evaluation module 108 determines that the student is performing to standard. If the evaluation module 108 determines that the student's data falls outside of the predetermined threshold, the evaluation module 108 determines that the student is failing to meet the standard. For example, if the evaluation module 108 does not detect any notes at appropriate times or detects extra notes, it also determines that the student is failing to meet the standard. Additionally, the evaluation module 108 is configured to determine how close the student's data falls within the predetermined threshold by providing qualitative and/or quantitative information. For example, the evaluation module 108 is configured to identify components or factors that the student has not met, such as notes and/or volume. Alternatively, the evaluation module 108 is configured to calculate the percentage gap between an acceptable range and the student's range. The feedback module 109 is configured to display performance evaluation and music score in real-time 406.

Referring now to FIGS. 5A and 5B, there are shown embodiments of the event correlation module and the evaluation module in operation. In the illustrated embodiments, the evaluation module 108 (FIG. 1) analyzes the following musical factors: rhythm 501, tempo 502, duration 503, dynamics 504, pedaling 505, volume 506, articulation 507, and note 508 from a student performance 117. Additionally, in FIG. 5A, the event correlation module 110 (FIG. 1) correlates the musical events in the student performance 117 with musical events in a first performance standard 301A, a second performance standard 301B, and a third performance standard 301C.

The event correlation module 110 (FIG. 1) can determine that the rhythm 501 of the student performance 117 correlates mostly to the first performance standard 301A. In this regard, the evaluation module 108 (FIG. 1) utilizes the acceptable range for rhythm from the first performance standard 301A to analyze the rhythm from the student's performance. Similarly, the event correlation module 110 (FIG. 1) can determine that the tempo 502 of the performance 117 correlates mostly to the second performance standard 301B. In this regard, the evaluation module 108 (FIG. 1) utilizes the acceptable range for tempo from the second performance standard 301B to analyze the tempo from the student's performance. Certain components of the student performance can correlate to more than one performance standard. For example, the duration 503 of the student performance 117 correlates to both the first performance standard 301A and the second performance standard 301B. In this regard, the evaluation module 108 (FIG. 1) utilizes the acceptable range for duration from the first and second performance standards 301A, 301B to analyze the duration from the student's performance. In some embodiments, two or more performance standards (e.g., first and second performance standards 301A, 301B) can be averaged to determine an average acceptable range.

If the student performance does not meet any of the performance standards, then the student performance 117 does not meet the composite performance standard 304. For example, if the student misses a note or plays additional or incorrect notes, the notes 508 played in the student performance 117 do not meet the first performance standard 301A and the second performance standard 301B. Therefore, the notes played 508 in the student performance do not meet the composite performance standard 304, as shown in FIG. 5B.

Figure 6:
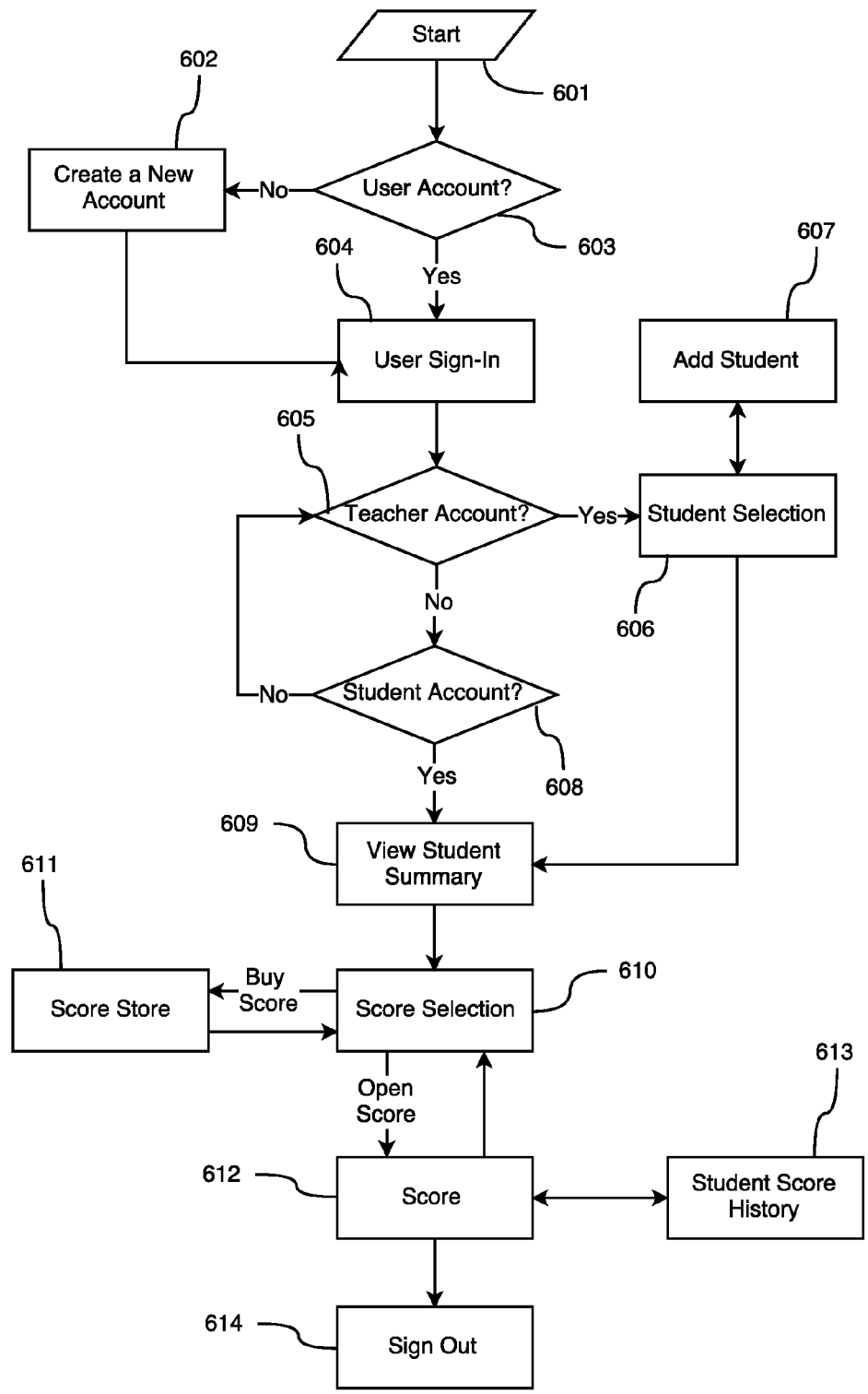
FIG. 6 shows a high-level logic diagram of the present system.

Referring now to FIG. 6, there is shown a high-level logic diagram of the present invention. To start 601, the application of the present invention provides a GUI from which users can sign-in to his or her account 604. As used herein, the term "user" refers to a student or a teacher, unless the context clearly suggests otherwise. If the user does not have an existing account 603, the user can create an account 602 by providing account information (e.g., username) and/or credentials before signing in and arriving at a home page.

The account can be a teacher account of a student account. The teacher account can be used to evaluate registered students' progress, assign homework, and communicate with students (e.g., via messages). The student account can be used to log practices, complete assignments, and communicate with teachers. If the user is a teacher and the teacher has a teacher account 605, then the teacher can select, from the home page, a student to review 606 the student's progress. If the student is a new student, the teacher can add the student 607 and then select that student to view the student summary 609. Similarly, the teacher can remove students. Without limitation, the student summary 117 (FIG. 1) comprises information about the student as well as the student's performances, previous evaluations, and the student's progress. The teacher can access the student summary to review the student's performances and make improvements and/or provide additional critique or comments.

If the user is a student and the student has a student account 608, the student can access his or her student summary 609 to enable the student to review his or her performances and receive additional feedback (i.e., from the teacher, not the feedback module). From the student summary, the user can select a music score 610 for a more detailed analysis of the student's performance associated with the score. Selecting the music score also enables the user to purchase additional music scores from a score store 611. Because each musical event of a musical performance is in a data set representing a music score, purchasing additional scores can provide a more comprehensive scoring by scoring more musical events in the student's performance. Purchased scores can be selected 610 then opened 612 to score the student's performance. Scored performances are stored in student score history 613. To log out of the user account, the user can sign out 614.

Figure 7:
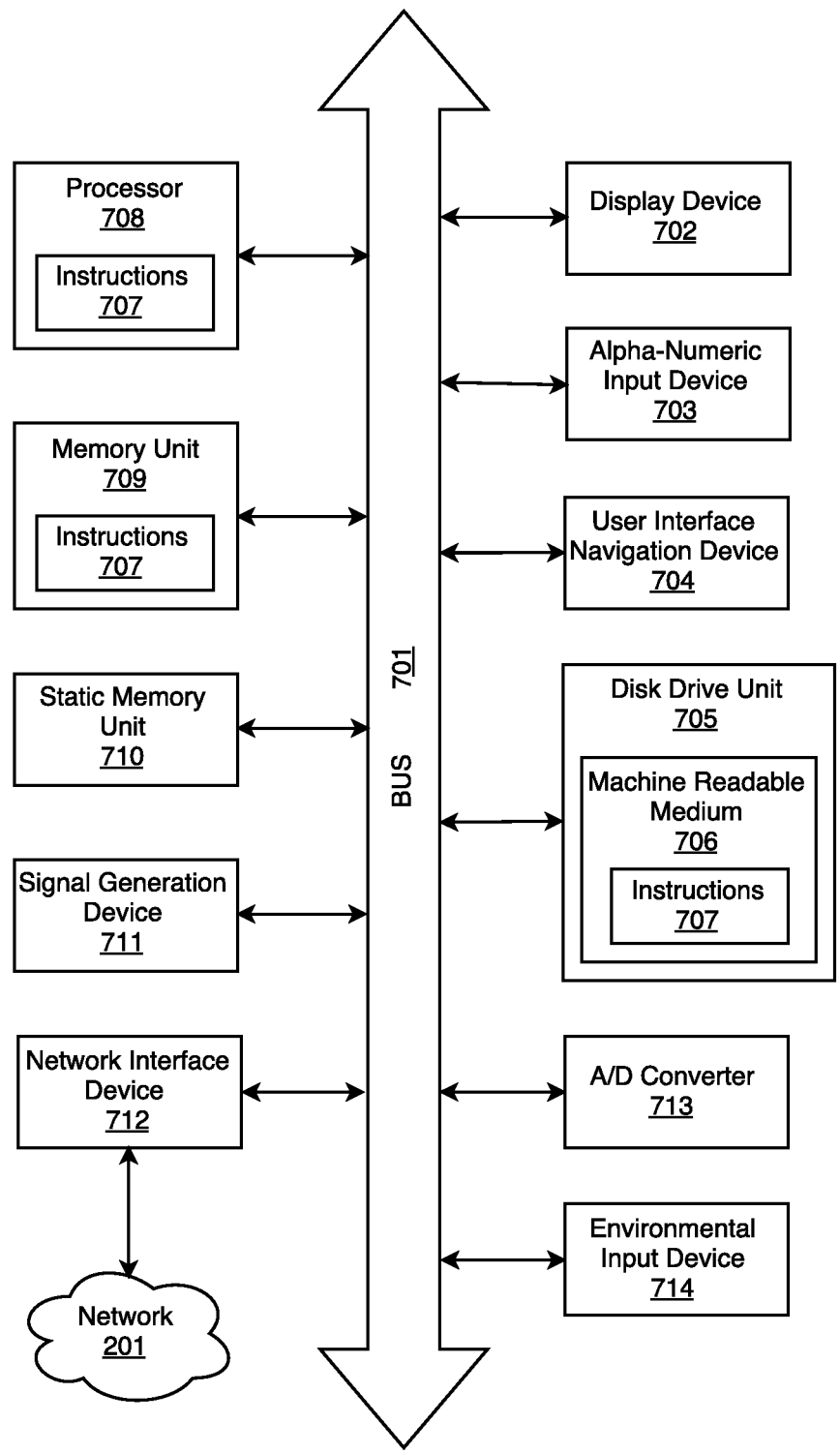
FIG. 7 shows a block diagram of a machine in the example form of a computer system within which a set of instructions, for causing the machine to perform any one or more of the methods discussed herein, may be executed.

Referring now to FIG. 7, is a block diagram of a machine in the example form of a computer system within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system includes a processor 708 (e.g., a central processing unit (CPU), a graphics processing unit (GPU)), a main memory unit 709, and a static memory unit 710, which communicate with each other via a bus 701. The computer system may further include a display device 702 (e.g., a liquid crystal display (LCD) or a cathode ray tube (CRT)). The computer system also includes an alphanumeric input device 703 (e.g., a keyboard), a user interface (UI) navigation device 704 (e.g., a mouse), a disk drive unit 705, a signal generation device 711 (e.g., a speaker), and a network interface device 712. The computer system may also include an environmental input device 714 that may provide a number of inputs describing the environment in which the computer system or another device exists, including, but not limited to, a light sensor, a still photo or video camera, and an audio sensor (e.g., a microphone). Additionally, the computer system includes an analog-to-digital (A/D) converter 713 for digitizing the analog sound waves received, for example, via a microphone, into digital format.

The disk drive unit 705 includes a machine-readable medium 706 on which is stored one or more sets of data structures and instructions 707 (e.g., software) embodying or utilized by any one or more of the methods or functions described herein. The instructions 707 may also reside, completely or at least partially, within the main memory unit 709 and/or within the processor 708 during execution thereof by the computer system. In this regard, the main memory unit 709 and the processor 708 are also considered machine-readable media.

While the machine-readable medium 706 is shown in an example embodiment to be a single medium, the term "machine-readable medium" may include a single medium or multiple media (e.g., a centralized or distributed database, and/or associated caches and servers) that store the one or more instructions 707 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

The instructions 707 may further be transmitted or received over a computer network 601 using a transmission medium. The instructions 707 may be transmitted using the network interface device 712 and any one of a number of well-known transfer protocols. The term "transmission medium" shall be taken to include any intangible medium that is capable of storing, encoding, or carrying instructions for execution by the machine, and includes digital or analog communications signals or other intangible media to facilitate communication of such software.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A music training system, comprising:
   a user device coupled to a musical instrument, said user device having a memory unit with instructions stored thereon and a processor operatively connected to said memory unit, wherein said processor is configured to execute said instructions to result in an application comprising:
   an event correlation module configured to correlate musical events in a digital performance data associated with a musical piece from a live musical performance with corresponding musical events in a reference data, wherein said reference data comprises at least one performance standard combined with at least one music score to provide a composite performance standard, further wherein said at least one music score represents each musical event in said musical piece;
   an evaluation module configured to compare said digital performance data with said reference data to determine whether said digital performance data falls within an acceptable range for one or more musical factors as defined by said reference data.

2. The musical training system of claim 1, wherein said application further comprises a feedback module configured to display performance evaluation and music score in real-time.

3. The musical training system of claim 1, wherein said musical instrument comprises a keyboard instrument.

4. The musical training system of claim 1, wherein said reference data comprises an aggregate performance standard, said aggregate performance standard comprising said at least one performance standard.

5. The musical training system of claim 1, wherein said at least one performance standard is derived from pre-recorded performances.

6. The musical training system of claim 1, wherein said at least one performance standard is derived from additional live musical performances.

7. The musical training system of claim 1, further comprising a database in communication with said user device, wherein said database comprises said reference data.

8. The musical training system of claim 1, wherein said one or more musical factors comprise rhythm, tempo, duration, dynamics, pedaling, volume, articulation, and note.

9. A music training system, comprising:
a user device coupled to a musical instrument, said user device having a memory unit with instructions stored thereon and a processor operatively connected to said memory unit, wherein said processor is configured to execute said instructions to result in an application comprising:
an event correlation module configured to correlate musical events in a digital performance data associated with a musical piece from a live musical performance with corresponding musical events in a reference data, wherein said event correlation module is further configured to identify a performance standard most closely resembling a performance style associated with said digital performance data;
an evaluation module configured to compare said digital performance data with said reference data to determine whether said digital performance data falls within an acceptable range for one or more musical factors as defined by said reference data.

10. The musical training system of claim 9, wherein said acceptable range for said one or more musical factors depend on said performance style associated with said digital performance data.

11. A method for music training, comprising the steps of:
a) receiving a live musical performance of a musical piece from a musical instrument;
b) converting said live musical performance into a digital performance data, wherein said digital performance data comprises musical events associated with said musical piece;
c) correlating said musical events in said digital performance data with corresponding musical events in a reference data; and
d) comparing said digital performance data with a composite performance standard to determine whether said digital performance data falls within an acceptable range for one or more musical factors as defined by said composite performance standard.

12. The method for music training of claim 11, further comprising the steps of displaying feedback in real-time, wherein said real-time feedback comprises performance evaluation and music score.

13. The method for music training of claim 11, wherein said musical instrument comprises a keyboard instrument.

14. The method for music training of claim 11, wherein said composite performance standard comprises at least one music score and at least one performance standard associated with said musical piece.

15. The method for music training of claim 11, further comprising the steps of determining a performance style by identifying a performance standard most closely resembling a performance style associated with said digital performance data.

16. The method for music training of claim 15, wherein said acceptable range for said one or more musical factors depend on said performance style associated with said digital performance data.

17. The method for music training of claim 11, further comprising the steps of recording said digital performance data in a database.

18. The method for music training of claim 14, wherein said at least one performance standard is derived from additional live musical performances.

* * * * *